US012258810B2

(12) United States Patent
Davis, II

(10) Patent No.: US 12,258,810 B2
(45) Date of Patent: Mar. 25, 2025

(54) DEVICE FOR DISTRIBUTING SEALANT MATERIALS AND METHODS OF USING THE SAME

(71) Applicant: Vitro Flat Glass LLC, Cheswick, PA (US)

(72) Inventor: William Davis, II, Fombell, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 559 days.

(21) Appl. No.: 17/487,500

(22) Filed: Sep. 28, 2021

(65) Prior Publication Data

US 2022/0098923 A1 Mar. 31, 2022

Related U.S. Application Data

(60) Provisional application No. 63/084,122, filed on Sep. 28, 2020.

(51) Int. Cl.
*B05C 5/02* (2006.01)
*B05C 11/10* (2006.01)
*E06B 3/673* (2006.01)

(52) U.S. Cl.
CPC ........ *E06B 3/67321* (2013.01); *B05C 5/0241* (2013.01); *B05C 5/027* (2013.01); *B05C 11/1002* (2013.01)

(58) Field of Classification Search
USPC ................................ 118/316, 679, 683, 697
See application file for complete search history.

(56) References Cited

U.S. PATENT DOCUMENTS 5,419,045 A 5/1995 Magdich
5,904,773 A * 5/1999 Himes ................. H05K 3/0088 118/316
6,368,408 B1 * 4/2002 Schuler .............. E06B 3/67321 118/316
7,275,570 B2 10/2007 McGlinchy et al.
7,445,682 B2 11/2008 James et al.
7,448,246 B2 11/2008 Briese et al.
7,610,681 B2 11/2009 Calcei et al.
7,802,365 B2 9/2010 McGlinchy
7,866,033 B2 1/2011 James et al.

(Continued)

FOREIGN PATENT DOCUMENTS

DE 102004047098 A1 4/2006
EP 0182747 A2 5/1986

(Continued)

*Primary Examiner* — Yewebdar T Tadesse
(74) *Attorney, Agent, or Firm* — The Webb Law Firm

(57) ABSTRACT

A device for delivering a sealant material includes a first nozzle having a first nozzle head and a second nozzle having a second nozzle head. The first and second nozzle heads each independently have an outlet, an inlet opposite the outlet, and an open channel that extends through a body of the nozzle heads from the inlet to the outlet. The first nozzle is spaced apart from the second nozzle to form a space between the nozzle heads to allow a component to enter a first side of the device and exit a second side of the device while passing by the first and second nozzle heads. A notch is formed through the body of each of the first and second nozzle heads at a side where the component exits the device to distribute a sealant material onto each side of the component.

10 Claims, 12 Drawing Sheets

(56) References Cited

U.S. PATENT DOCUMENTS

| | | | |
|---|---|---|---|
| 7,901,526 | B2 | 3/2011 | James et al. |
| 8,056,234 | B2 | 11/2011 | Calcei et al. |
| 8,430,588 | B2 | 4/2013 | Haack |
| 8,474,400 | B2 | 7/2013 | McGlinchy et al. |
| 8,720,026 | B2 | 5/2014 | McGlinchy |
| 8,904,611 | B2 | 12/2014 | Calcei et al. |
| 9,212,515 | B2 | 12/2015 | Calcel et al. |
| 9,279,283 | B2 | 3/2016 | Briese et al. |
| 9,428,953 | B2 | 8/2016 | Briese et al. |
| 9,765,564 | B2 | 9/2017 | Briese et al. |
| 10,156,515 | B2 | 12/2018 | Briese et al. |
| 10,184,290 | B2 | 1/2019 | Briese et al. |
| 10,267,083 | B2 | 4/2019 | Briese et al. |
| 10,316,578 | B2 | 6/2019 | Briese et al. |
| 10,352,090 | B2 | 7/2019 | Briese et al. |
| 10,352,091 | B2 | 7/2019 | Briese et al. |
| 10,369,617 | B2 | 9/2019 | Briese et al. |
| 10,533,367 | B2 | 1/2020 | Briese et al. |
| 10,577,856 | B2 | 3/2020 | Briese et al. |
| 2003/0205315 | A1 | 11/2003 | McGlinchy et al. |
| 2018/0207668 | A1 | 7/2018 | Rutz et al. |

FOREIGN PATENT DOCUMENTS

| | | | |
|---|---|---|---|
| EP | 0286136 | A1 | 10/1988 |
| EP | 2459320 | B1 | 6/2012 |

* cited by examiner

DEVICE FOR DISTRIBUTING SEALANT MATERIALS AND METHODS OF USING THE SAME

CROSS REFERENCE TO RELATED APPLICATIONS

This application claims the benefit of U.S. Provisional Application No. 63/084,122, filed Sep. 28, 2020, which is incorporated herein by reference in its entirety.

BACKGROUND OF THE INVENTION

Field of the Invention

The present invention relates to devices for distributing a sealant material, such as for distributing a sealant material onto the sides of a spacer for an insulating glazing unit, as well as methods of using the devices, spacers formed therefrom, and insulated glazing units formed with the spacers.

Description of Related Art

Insulated glass units (IGU's) are formed from two or more plies of glass separated by one or more spacers to form an air gap between the plies of glass. Sealant materials are applied to the spacers to bond the plies of glass to the spacer while also providing a gas and liquid barrier to prevent gas, such as air, and liquids, such as water, from flowing into and out of the air gap. The amount, placement, size, and shape of the sealant materials applied to the spacer contribute to the effectiveness of the sealant material as well as the resulting IGU.

Considerable efforts have been expended to develop methods and devices for forming IGU's, including devices and methods for preparing spacers. While current devices and methods can provide spacers with sealant materials for use in IGU's, there is a need for an improved system to apply sealant materials that can provide better performance in the final IGU, a faster overall application process, improved weathering properties, and the like.

Thus, it is desirable to provide an improved device and method of applying sealant materials, which can be used in preparing spacers for IGU's.

SUMMARY OF THE INVENTION

The present invention includes a device for delivering a sealant material. The device includes a first nozzle comprising a first nozzle head, and a second nozzle comprising a second nozzle head. The first and second nozzle heads each independently have an outlet, an inlet opposite the outlet, and an open channel that extends through a body of the nozzle heads from the inlet to the outlet. The first nozzle is spaced apart from the second nozzle, such that the outlet of the first nozzle head faces the outlet of the second nozzle head with a space formed between the nozzle heads to allow a component to enter a first side of the device and exit a second side of the device while passing by the first and second nozzle heads. A notch is formed through the body of each of the first and second nozzle heads at a side where the component exits the device to distribute a sealant material onto each side of the component.

The present invention is also directed to a method of applying a sealant material onto a spacer for an insulating glass unit. The method includes passing an elongated spacer through the space formed between the first and second nozzle heads of the previously described device; and applying a sealant material to a first side of the spacer with the first nozzle and to a second opposite side of the spacer with the second nozzle as the spacer is passed through the device.

The present invention further includes a spacer comprising sealant material formed from the previously described method, as well as an insulating glass unit comprising such a spacer formed between opposing glass plies.

The present invention is also directed to the following clauses:

A first aspect is directed to a device for delivering a sealant material, comprising: a first nozzle comprising a first nozzle head; and a second nozzle comprising a second nozzle head, the first and second nozzle heads each independently comprising an outlet, an inlet opposite the outlet, and an open channel that extends through a body of the nozzle heads from the inlet to the outlet, wherein the first nozzle is spaced apart from the second nozzle such that the outlet of the first nozzle head faces the outlet of the second nozzle head, with a space formed between the nozzle heads to allow a component to enter a first side of the device and exit a second side of the device while passing by the first and second nozzle heads, and wherein a notch is formed through the body of each of the first and second nozzle heads at a side where the component exits the device to distribute a sealant material onto each side of the component.

A second aspect is directed to the device of the first aspect, wherein the notches extend through a portion of the body of each nozzle head in a longitudinal direction from the outlet toward the inlet.

A third aspect is directed to the device of the first or second aspects, wherein a height of the notches at the outlets of the nozzle heads are greater than a height of the notches where the notches end within the body of the nozzle heads.

A fourth aspect is directed to the device of any of the preceding aspects, wherein a thickness of the notches extends laterally through the body of the nozzle heads in a direction from a second side of the nozzle heads to the first side of the nozzle heads, and wherein the thickness of the notches extends past the open channels to a point before the first side of the nozzle heads.

A fifth aspect is directed to the device of any of the preceding aspects, wherein the notches extend longitudinally at a distance of no more than half of the length of the body of the nozzle heads.

A sixth aspect is directed to the device of any of the preceding aspects, wherein the first and second nozzles each independently comprise a single nozzle.

A seventh aspect is directed to the device of any of the preceding aspects, wherein the notches are triangular shaped.

An eighth aspect is directed to the device of the seventh aspect, wherein the triangular shaped notches have three points, and wherein a first point of the triangular shaped notches extend through the body of each nozzle head in a longitudinal direction, and a second point and third point of the triangular notches extend through the body of each nozzle head in opposite vertical directions.

A ninth aspect is directed to the device of any of the preceding aspects, further comprising at least one pump that distributes sealant material through the first and second nozzles heads.

An tenth aspect is directed to the device of any of the preceding aspects, further comprising a controller in operable communication with the at least one pump, and one or more computer-readable storage mediums in operable communication with the controller and containing programming instructions that, when executed, cause the controller to distribute the sealant material through the first and second nozzle heads.

An eleventh aspect is directed to the device of any of the preceding aspects, wherein the outlets of the nozzle heads are spaced apart at a distance to apply the sealant material onto opposite sides of an elongated spacer for an insulating glass unit.

A twelfth aspect is directed to a method of applying a sealant material onto a spacer for an insulating glass unit, the method comprising: passing an elongated spacer through the space formed between the first and second nozzle heads of the device according to any one of the first through eleventh aspects; and applying a sealant material to a first side of the spacer with the first nozzle and a sealant material to a second opposite side of the spacer with the second nozzle as the spacer is passed through the device.

A thirteenth aspect is directed to the method of the twelfth aspect, wherein the first and second nozzle heads are spaced at a distance such that the outlets of the first and second nozzle heads are substantially flush with the first and second sides of the spacer.

A fourteenth aspect is directed to the method of the twelfth or thirteenth aspects, wherein the notches extend through a portion of the body of each nozzle head in a longitudinal direction from the outlet toward the inlet.

A fifteenth aspect is directed to the method of the fourteenth aspect, wherein the notches extend longitudinally at a distance of no more than half of the length of the body of the nozzle heads.

A sixteenth aspect is directed to the method of any one of the fourteenth or fifteenth aspects, wherein a thickness of the notches extend laterally through the body of the nozzle heads in a direction from a second side of the nozzle heads to the first side of the nozzle heads, and wherein the thickness of the notches extends past the open channels to a point before the first side of the nozzle heads.

A seventeenth aspect is directed to the method of any one of the twelfth through sixteenth aspects, wherein the device comprises at least one pump that distributes the sealant material through the first and second nozzles heads.

An eighteenth aspect is directed to the method of the seventeenth aspect, wherein the pump moves the sealant material to create an upstream line pressure in a range of from 400 psi to 1200 psi.

A nineteenth aspect is directed to the method of the seventeenth or eighteenth aspects, wherein the device further comprises a controller in operable communication with the at least one pump, and one or more computer-readable storage mediums in operable communication with the controller and containing programming instructions that, when executed, cause the controller to distribute the sealant material through the first and second nozzle heads, and wherein the method comprises automatically applying the sealant material to the first side of the spacer with the first nozzle and the sealant material to the second side of the spacer with the second nozzle as the spacer is passed through the device.

A twentieth aspect is directed to a spacer comprising sealant materials formed from the method of any one of the twelfth through nineteenth aspects.

A twenty-first aspect is directed to an insulating glass unit comprising the spacer of the twentieth aspect formed between opposing glass plies.

DESCRIPTION OF THE INVENTION

Figure 1:
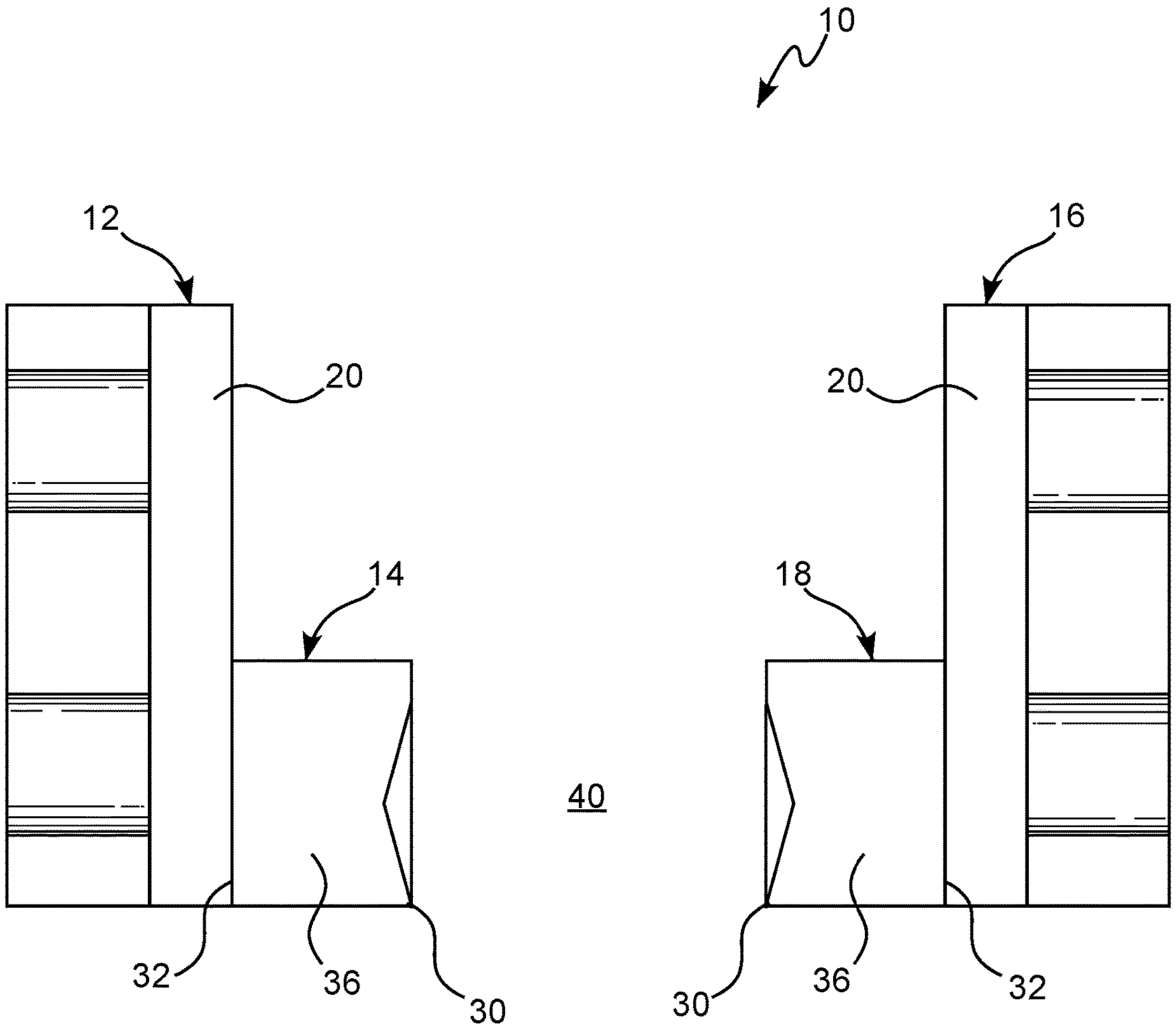
FIG. 1 is a front view of a sealant distribution device according to the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As shown in FIG. 1, the present invention is directed to a device 10 for distributing sealant materials. The sealant materials distributed through the device 10 are selected to provide desirable gas and liquid barrier properties. The sealant materials can also be selected to provide good adhesive properties. Non-limiting examples of suitable sealant materials include hot melt butyl, reactive hot melt butyl, polyurethanes, polyisobutylenes, reactive polyisobutylenes, silane terminated polymers, silicones, silicone modified polyurethanes, and combinations thereof.

Referring again to FIG. 1, the device 10 includes a first nozzle 12 having a first nozzle head 14 and a second nozzle 16 having a second nozzle head 18. The first and second nozzle heads 14 and 18 can extend out from the body 20 of the nozzles 12 and 16 to deliver sealant materials onto a component. The nozzles 12 and 16 and their respective nozzle heads 14 and 18 can each independently have various sizes and shapes to be used in different systems and for various applications. For example, the nozzle heads 14 and 18 can have a rectangular shape, a square shape, or a circular shape to distribute a particular amount of sealant material. As further shown in FIG. 1, the nozzles 12 and 16 can each have a single nozzle head 14 and 18. Alternatively, the nozzles 12 and 16 may each have two or more nozzle heads 14 and 18.

Figure 2:
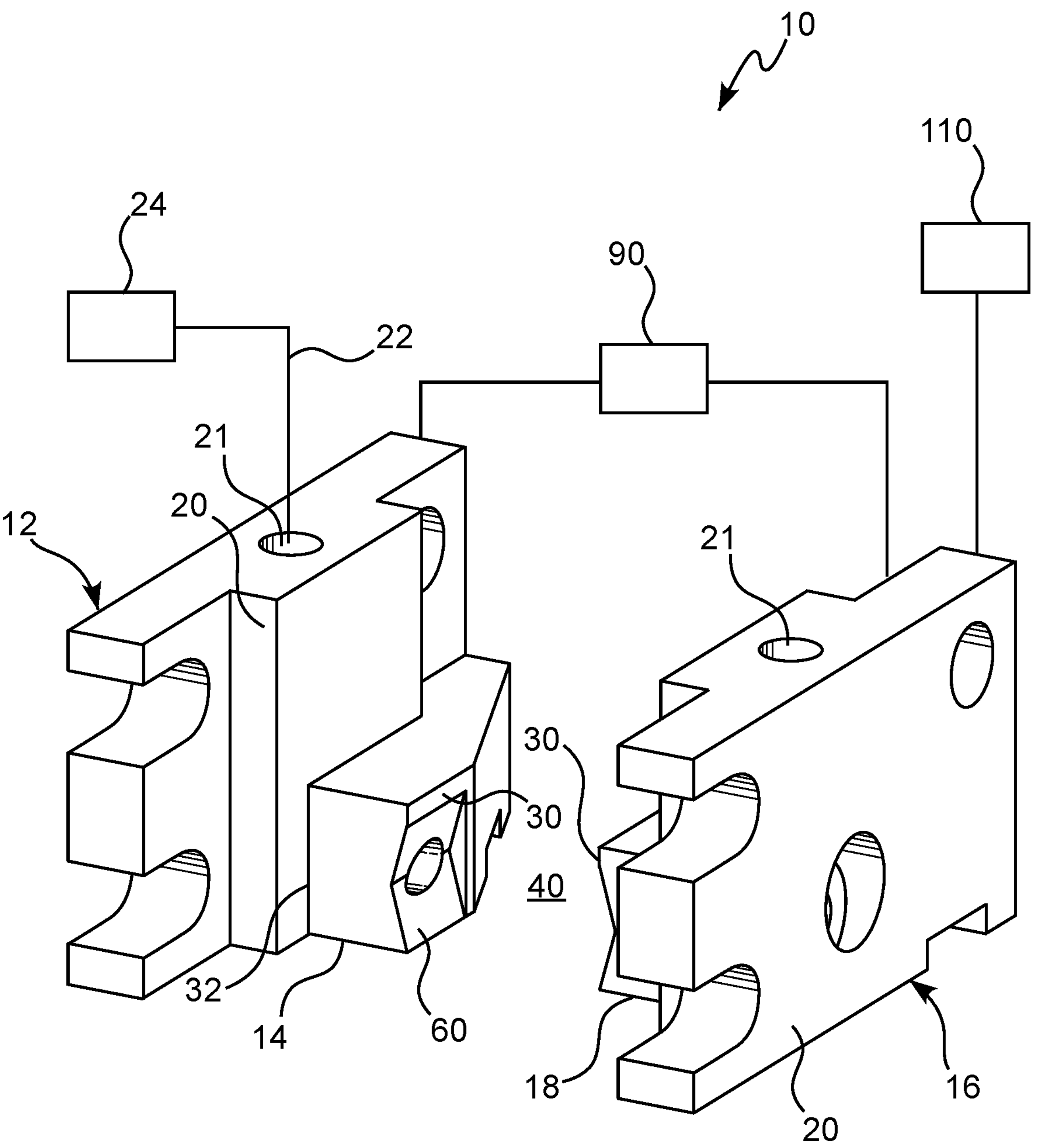
FIG. 2 is a perspective view of the sealant distribution device shown in FIG. 1.

As shown in FIG. 2, the nozzle heads 14 and 18 are in fluid communication with fluid passages 21 formed through the body 20 of the nozzles 12 and 16 where sealant materials are distributed into and through the nozzles 12 and 16. The fluid passage 21 can be formed through any portion of the body 20 of the nozzles 12 and 16, provided that sealant materials can pass into and through the nozzle heads 14 and 18. For example, the fluid passages 21 can be formed through a side or top of the body 20 of the nozzles 12 and 16 so that the passages 21 extend to the nozzle heads 14 and 18. It will be appreciated that the fluid passages 21 can extend through the body 20 of the nozzles 12 and 16 in any direction, provided that the fluid passages 21 are in fluid communication with the nozzles heads 14 and 18.

As further shown in FIG. 2, the first and second nozzles 12 and 16 are in fluid communication with conduits 22, such as through the use of injectors positioned in the fluid passages 21, that are in turn in fluid communication with a containment apparatus 24 containing sealant materials. The conduits 22 can comprise tubes made from a material comprising, for example, plastic, rubber, metal, or a combination thereof. The containment apparatus 24 containing sealant materials can include tanks, barrels, and other types of vessels that are sufficient to contain and store sealant materials.

Figure 3:
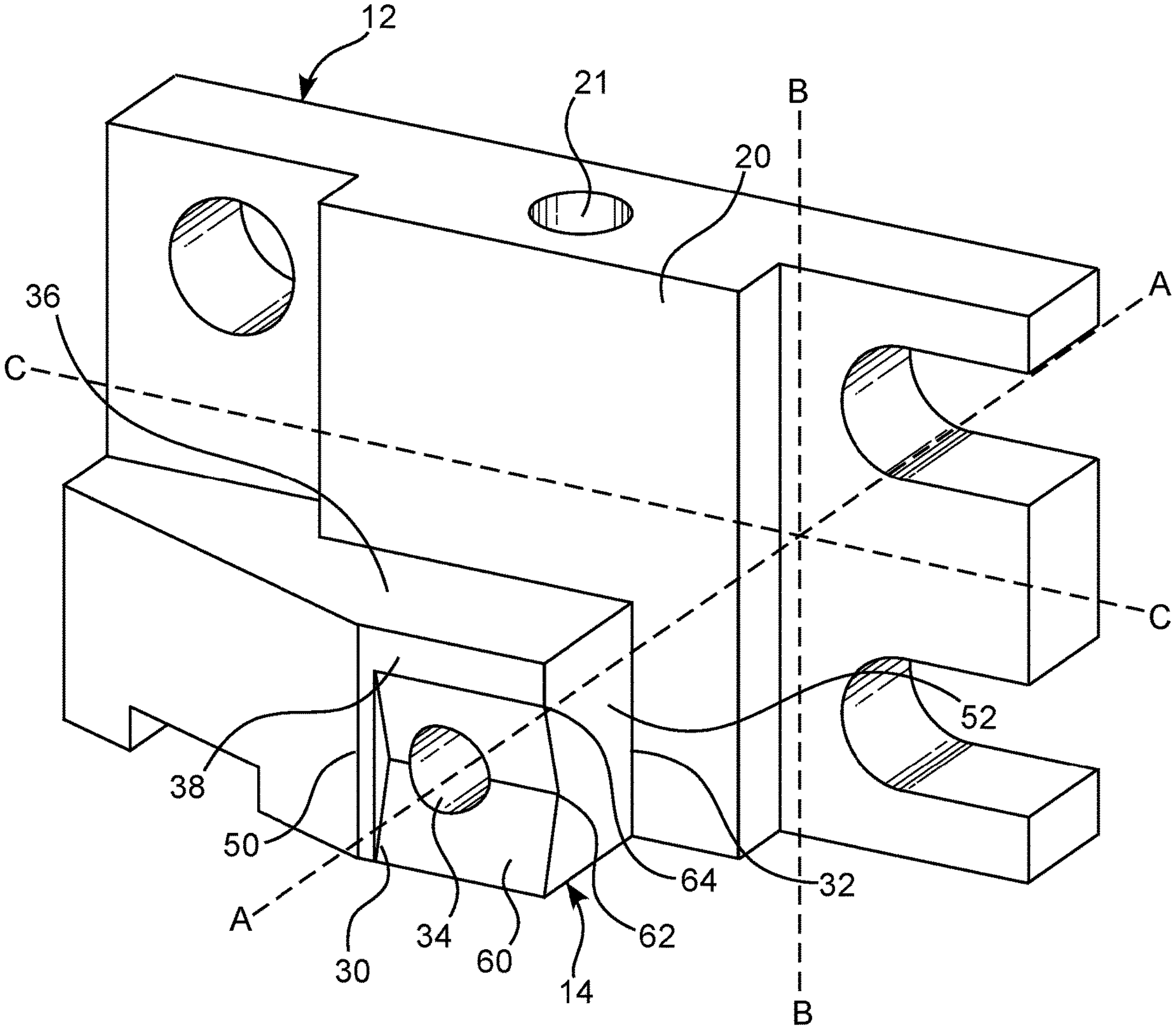
FIG. 3 is a perspective side view of a nozzle of the sealant distribution device according to the present invention.
Figure 4:
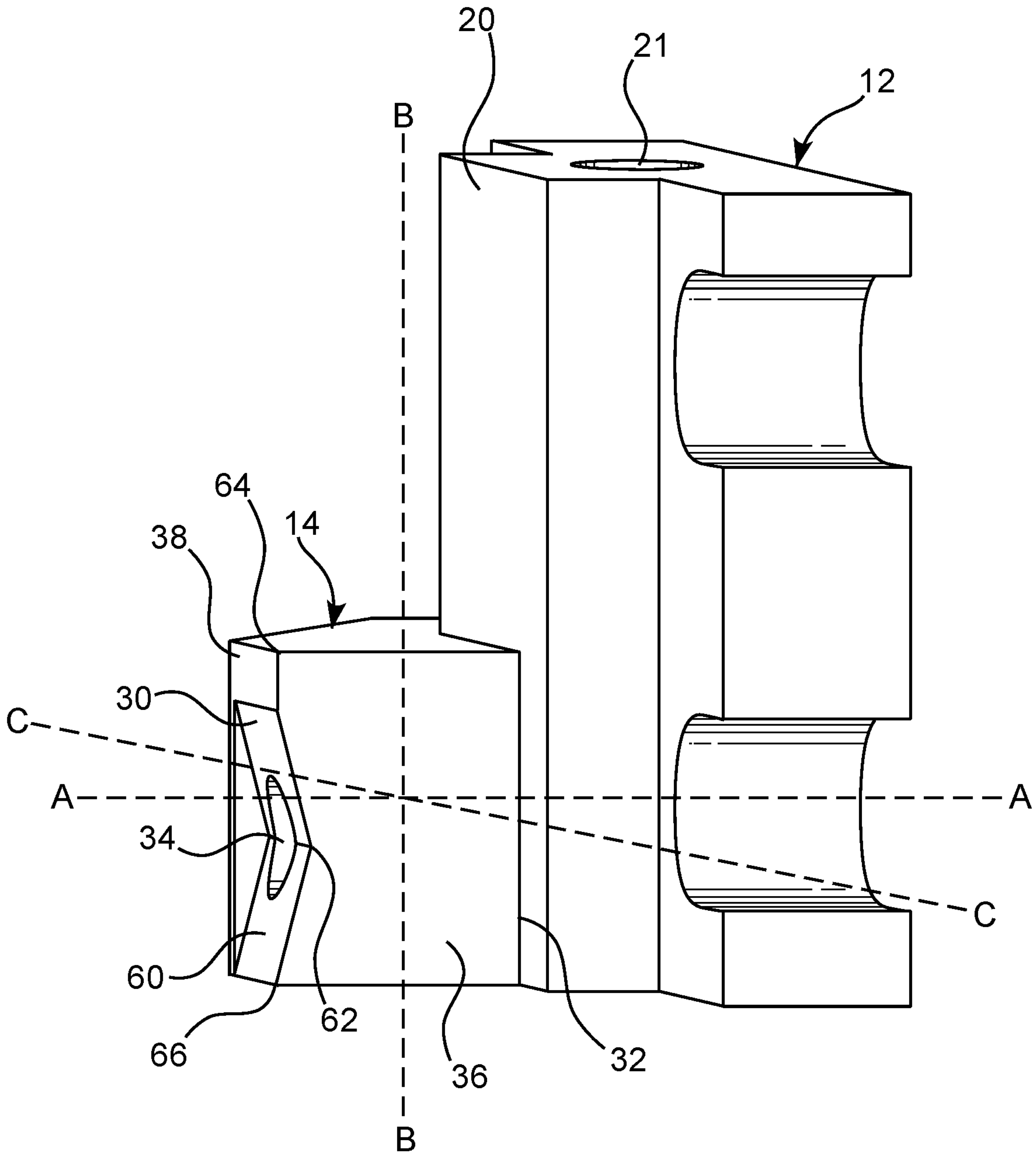
FIG. 4 is a perspective front view of a sealant distribution device according to the present invention.

As shown in FIGS. 3 and 4, various features of the first nozzle 12 are illustrated. However, it will be appreciated that the features illustrated in FIGS. 3 and 4 represent features found in both the first and second nozzles 12 and 16 of the device 10. Therefore, the features described herein with respect to FIGS. 3 and 4 will be referred to as the features found in both the first and second nozzles 12 and 16.

Referring to FIGS. 3 and 4, the nozzle heads 14 and 18 each independently comprise an outlet 30 where sealant materials exit the nozzles 12 and 16, an inlet 32 opposite the outlet 30, and an open channel 34 that extends through a body 36 of the nozzle heads 14 and 18 from the inlet 32 to the outlet 30 where sealant materials flow into by way of the fluid passages 21. As further shown in FIGS. 3 and 4, the outlet 30 of each nozzle head 14 and 18 has an outer face 38 that forms a perimeter around at least a portion of the open channels 34 where sealant materials exit the open channels 34.

The open channels 34 that extend through the body 36 of the nozzle heads 14 and 18 can have various shapes and sizes provided that the open channels 34 are able to receive and deliver sealant materials out of the nozzles 12 and 16 and onto a component such as, for example, a spacer for an insulating glass unit (IGU). It is appreciated that the open channels 34 are sized to distribute a sufficient amount of sealant materials to provide the desired sealant properties between the component and one or more surfaces that the component is attached.

Figure 5:
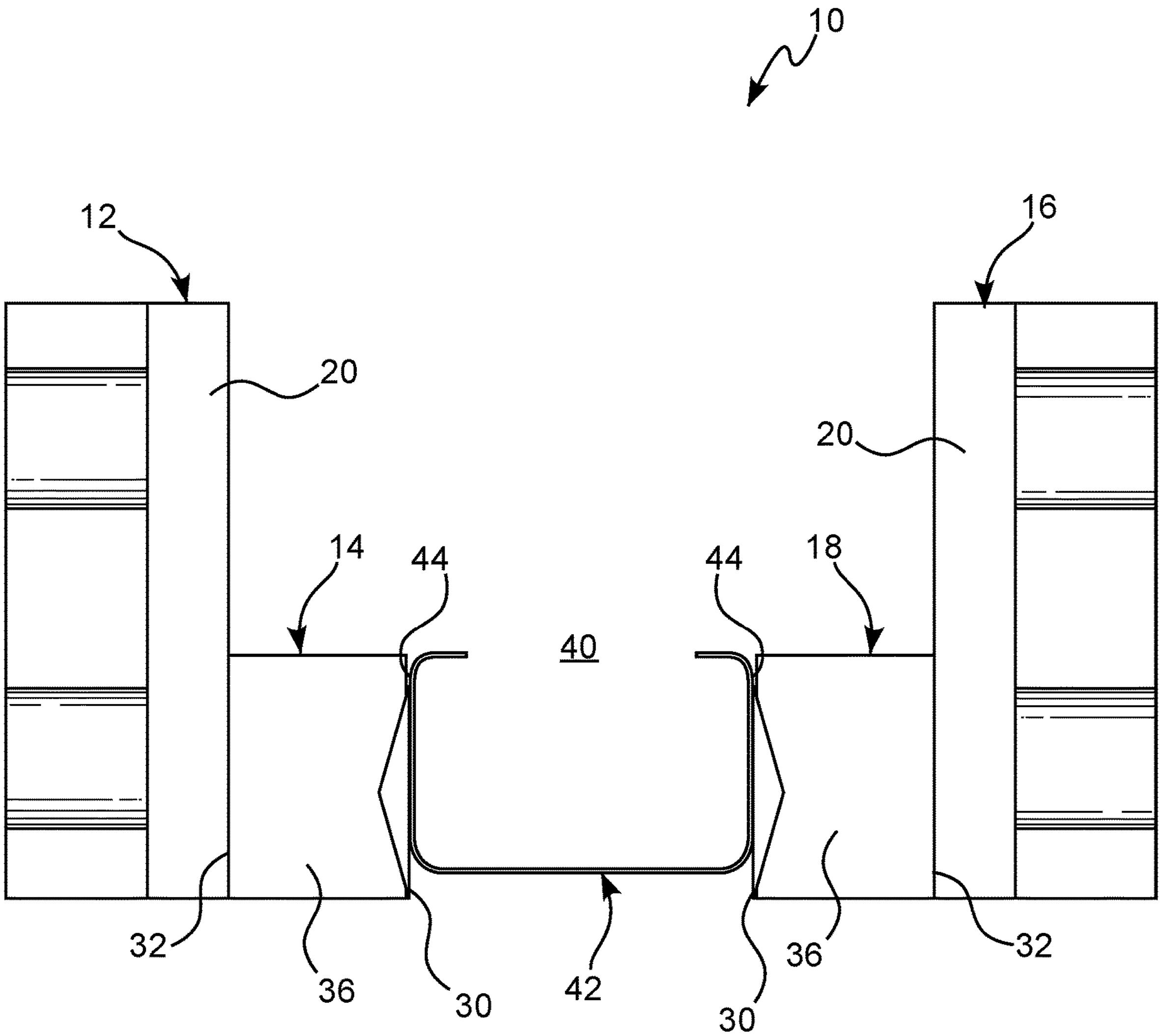
FIG. 5 is a front view of the sealant distribution device in FIG. 1 with a spacer passing between the nozzle heads.
Figure 6:
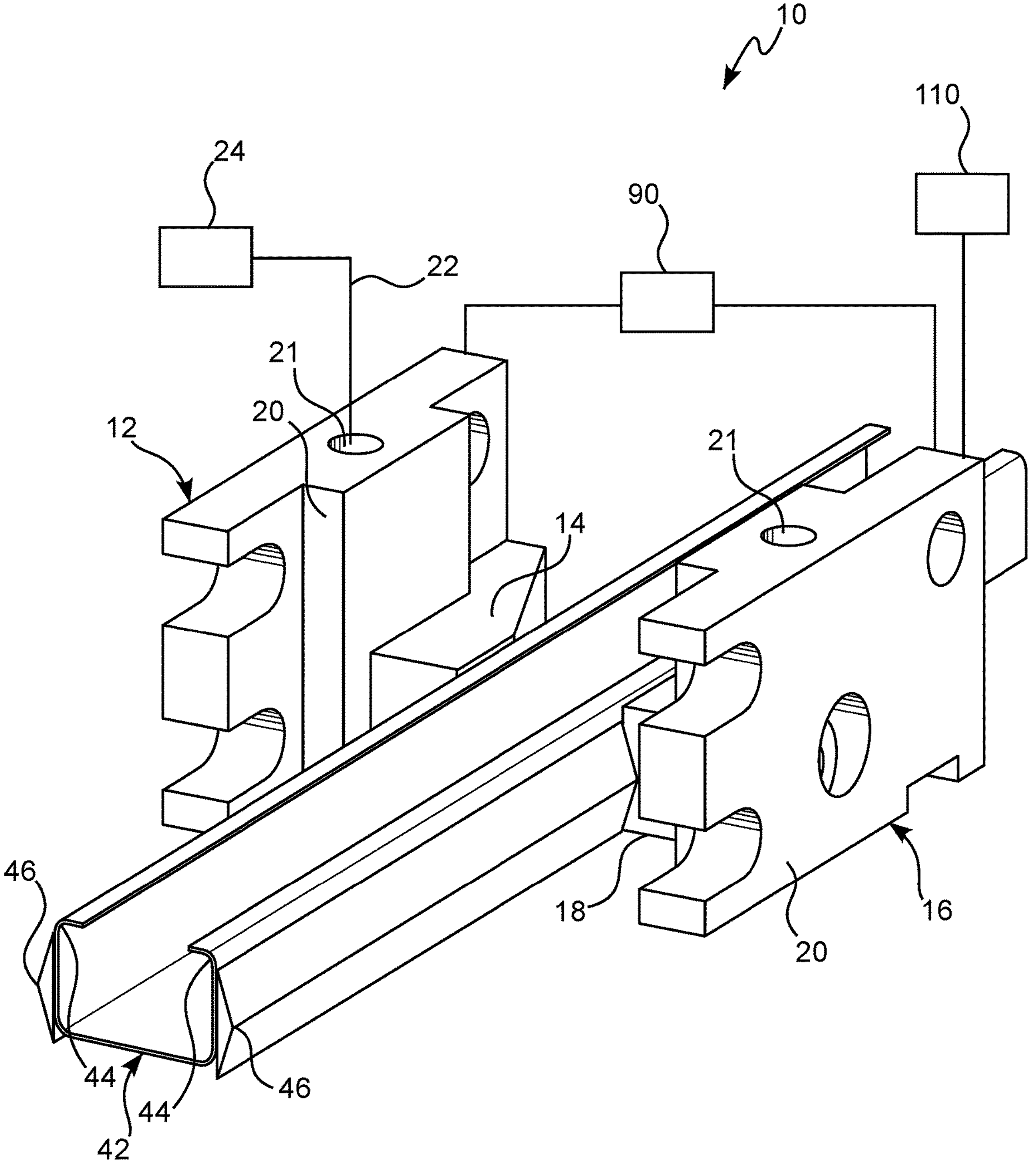
FIG. 6 is a perspective view of the sealant distribution device in FIG. 2 with a spacer passing between the nozzle heads.

Referring to FIG. 1, the first nozzle 12 is spaced apart at a distance from the second nozzle 16 such that the outlet 30 of the first nozzle head 14 faces the outlet 30 of the second nozzle head 18 with a space 40 formed between the nozzle heads 14 and 18. Referring to FIGS. 5 and 6, the distance between the nozzle heads 14 and 18 is selected to form a space 40 that allows a component 42 with opposing sides 44 to pass between the nozzle heads 14 and 18 while a sealant material 46 is delivered out of the nozzle heads 14 and 18 and onto surfaces of the opposing sides 44 of the component 42. For example, and as shown in FIGS. 5 and 6, the component 42 can comprise a channel-shaped elongated spacer, and the nozzle heads 14 and 18 are spaced apart at a distance to distribute and apply the sealant material 46 onto the surfaces of opposing sides 44 of the channel-shaped elongated spacer of component 42.

As shown in FIGS. 3 and 6, it is appreciated that during application of the sealant material 46, the component 42 enters through the space 40 between the nozzles 12 and 16 at a first side 50 of the nozzle heads 14 and 18, which also designates the entrance into the space 40 between the nozzle heads 14 and 18 where the component 42 enters. The component 42 moves through the space 40, with opposing sides 44 of the component 42 passing by the outlets 30 of the nozzle heads 14 and 18, as sealant materials are applied over the opposing sides 44. The component 42 then exits the device 10 at a second side 52 of the nozzles heads 14 and 18, which also designates the outlet from the space 40 between the nozzle heads 14 and 18 where the component 42 exits the device with sealant material formed over the opposing sides 44.

Referring to FIG. 4, the nozzles 12 and 16 each independently have a notch 60 formed through the body 36 of the nozzle heads 14 and 18. The notches 60 are formed through at least the second side 52 of the nozzle heads 14 and 18. The notches 60 extend through a portion of the body 36 of each nozzle head 14 and 18 in a longitudinal direction (illustrated as reference letter “A”) from the nozzle outlets 30 toward the nozzle inlets 32. As shown in FIGS. 3 and 4, the notches 60 extend at least through the outer face 38 at the second sides 52 of the nozzle heads 14 and 18 and into a portion of the body 36.

As shown in FIGS. 3 and 4, the thickness of the notches 60 can extend laterally (illustrated as reference letter “C”) through the body 36 of the nozzle heads 14 and 18 in a direction from the second side 52 toward the first side 50 of the nozzle heads 14 and 18. For instance, referring to FIG. 3, the thickness of the notches 60 can extend laterally (illustrated as reference letter “C”) through the body 36 of the nozzle heads 14 and 18 from the second side 52 and past the open channels 34 toward the first side 50. In such examples, the thickness of the notches 60 can extend laterally (illustrated as reference letter “C”) past the open channels 34 to a point before the first side 50. That is, the thickness of the notches 60 do not extend through the first side 50 of the body 36 of the nozzle heads 14 and 18.

Referring to FIGS. 3 and 4, the open channel 34 is set-back from the outer face 38 of the outlets 30 of the nozzle heads 14 and 18. As such, the notch 60 forms a cavity within the body 36 of the nozzle heads 14 and 18 with the open channel 34 positioned in the back of the cavity so that sealant materials 46 exit the open channel 34 into the cavity formed from the notches 60. It is appreciated that the outer face 38 and portion of the body 36 at the second side 52 of the nozzles heads 14 and 18 is removed when forming the notch 60, thereby leaving an open area in a portion of the second side 52.

The notches 60 can have various shapes and sizes formed through the nozzle heads 14 and 18 to provide a desired shape and amount of sealant material 46 onto the surfaces of opposing sides 44 of the component 42 (e.g. a channel-shaped spacer) as shown in FIGS. 5 and 6. For instance, the notch 60 can extend longitudinally (illustrated as reference letter "A") from the outlet 30 to the inlet 32 at a distance of no more than half (i.e. 50% or less) of the length of the body 36 of the nozzle heads 14 and 18, or at a distance of no more than a ¼ (i.e. 25% or less) of the length of the body 36 of the nozzle heads 14 and 18, or at a distance of no more than a 1⁄10 (i.e. 10% or less) of the length of the body 36 of the nozzle heads 14 and 18.

The notches 60 can also be sized to provide a desired volume of sealant onto a selected area of the component 42. For example, the notches 60 can be sized to provide an amount of sealant of from 0.006 to 0.010 cubic inches per linear inch of component 42 per side 44 of the component 42, such as about 0.008 cubic inches per linear inch of component 42 per side 44 of the component 42.

Referring to FIGS. 3 and 4, the notches 60 can also be shaped and sized such that the height of the notches 60, as measured in the vertical direction (vertical direction illustrated as reference letter "B"), at the outlets 30 of the nozzle heads 14 and 18 is wider than a height of the notches 60 where the notches 60 end within the body 36 of the nozzle heads 14 and 18. Thus, in such examples, the notches 60 taper in the longitudinal direction (illustrated as reference letter "A") from the outlet 30 to the inlet 32 of the nozzle heads 14 and 18.

The notches 60 can also form a desired shape including, but not limited to, a triangular shape, a trapezoid shape, and the like. For example, and as shown in FIGS. 3 and 4, the notches 60 are triangularly shaped and have three points 62, 64, and 66 with a first point 62 extending through the body 36 of the nozzle heads 14 and 18 in a longitudinal direction (illustrated as reference number "A"). That is, a first point 62 of each triangular notch 60 extends through the body 36 of the nozzle heads 14 and 18 in a longitudinal direction (illustrated as reference letter "A") toward the inlet 32 of the nozzle heads 14 and 18. The second point 64 and third point 66 of the triangular notches 60 extend through the body 36, such as along the outer face 38 of the second sides 52, of each nozzle head 14 and 18 in opposite vertical directions (vertical direction illustrated as reference letter "B").

As previously described, the opposing sides 44 of the component 42 pass by the outlets 30 of the first and second nozzle heads 14 and 18 at a selected distance to receive the sealant material 46 exiting the open channels 34. For instance, the opposing sides 44 of the component 42 can be spaced at a distance from the outer face 38 of the outlets 30 so that the opposing sides 44 are flush or substantially flush with the outer face 38 of the outlets 30 to form enclosed cavities. As sealant material 46 is distributed through the open channels 34, the sealant material 46 fills the cavities of the notches 60. Because the outer face 38 and portion of the body 36 at the second sides 52 of the nozzles heads 14 and 18 is removed by the notches 60, sealant material 46 is formed onto the sides 44 of the component 42 as the component 42 exits the space 40 formed between the nozzle heads 14 and 18. It is appreciated that the sealant material 46 formed on the sides 44 of the component 42 will be in the shape of the notches 60.

Figure 7:
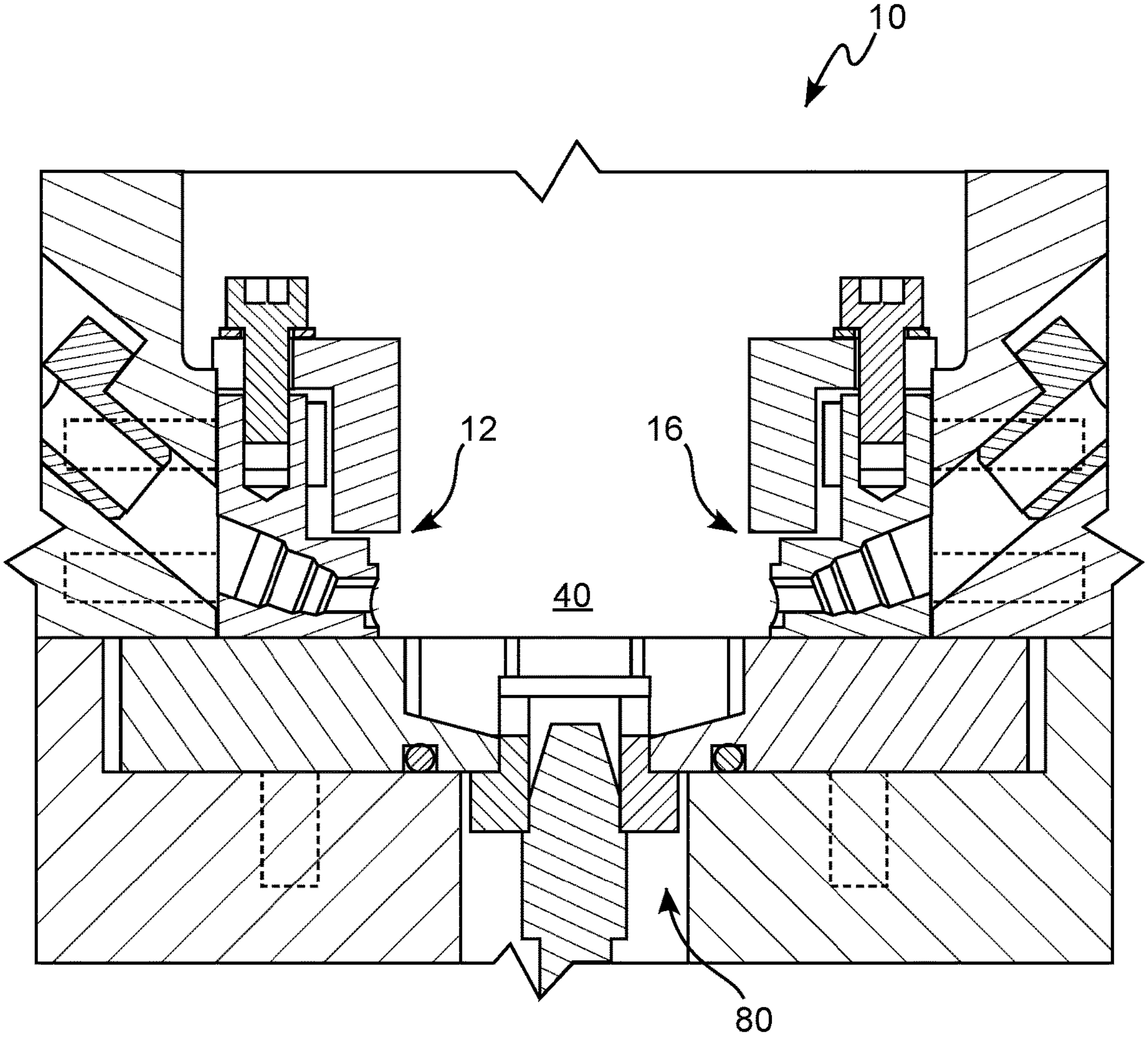
FIG. 7 is a front view of a sealant distribution device according to the present invention that includes an additional nozzle.

The device 10 can also have additional components. For example, and as shown in FIG. 7, device 10 can include an additional nozzle 80 that is positioned below the space 40 to apply sealant material 46 to a bottom portion of the component 42. The additional nozzle 80 can include all or only a portion of the features that form the previously described nozzles 12 and 16. Alternatively, the additional nozzle 80 can be different from the previously described nozzles 12 and 16.

Referring to FIG. 2, the device 10 can also include at least one pump 90 for controlling the distribution of sealant material 46 into the nozzles 12 and 16. The device 10 can comprise one pump 90 that controls the distribution of sealant material 46 into both the first and second nozzles 12 and 16. Alternatively, the device 10 can comprise two or more pumps 90 that control the distribution of sealant material 46 into the first and second nozzles 12 and 16, separately. The pump(s) 90 can be used to control the amount and speed at which the sealant material 46 is distributed into the first and second nozzles 12 and 16.

Non-limiting examples of other components that can be used with the device 10 include sensors (not shown) that detect various parameters and conditions within the nozzles 12 and 16, nozzle heads 14 and 18, and/or space 40 formed between the nozzle heads 14 and 18. The sensors can be used to detect parameters and conditions including temperature, pressure, sealant flow rate, and/or the presence of sealant material 46 within the nozzle head bodies 36, open channels 34, and/or space 40 formed between the nozzle heads 14 and 18, for example. For instance, the nozzle heads 14 and 18 can have thermocouples for measuring sealant temperature as well as pressure transducers for maintaining consistent dispensing pressure.

Additionally, the device 10 can also include temperature control components to heat or cool the temperature within the open channels 34, fluid passages 21, and/or conduits 22 in fluid communication with the containment apparatus 24. For example, the nozzles 12 and 16 can be heated through conduction such as by using a manifold having heating elements (e.g. heater rods) and thermocouples.

Additionally, referring to FIG. 2, the device 10 can include a controller 110 that is in operable communication with one or more computer-readable storage mediums that cause the controller to distribute sealant material 46 into and through the nozzles 12 and 16 using the one or more pumps 90. The controller 110 also has knowledge of, or access to, information from other components such as the sensors. It is appreciated that the controller 110 may include one or more microprocessors, CPUs, and/or other computing devices.

The controller 110 and one or more computer-readable storage mediums can be used to automatically control the device 10. As used herein, the term "automatic control" refers to the absence of substantial participation of a human operator during normal operations of the device 10 without manually controlling the controllable components. As such, the device 10 can be controlled without an operator monitoring or adjusting the various parameters of the device 10 during normal operations.

As indicated, the component 42 that receives the sealant material 46 can comprise a spacer for use in an insulating glass unit (IGU). As such, the present invention includes a method of applying a sealant material onto a spacer (e.g. a channel-shaped elongated spacer) for an IGU. The method includes passing component 42 comprising the spacer through the space 40 formed between the first and second nozzle heads 14 and 18 of the device 10. The spacer enters the space 40 at the first side 50 of the nozzle heads 14 and 18. The spacer of component 42 moves through the space 40 with opposing sides 44 of the spacer of component 42 passing by the outlets 30 of the nozzle heads 14 and 18 as sealant material 46 is being distributed through the nozzle heads 14 and 18.

Each side 44 of the spacer of component 42 is spaced at a distance from the respective first and second nozzle heads 14 and 18 to receive the sealant material 46. For example, the distance between the nozzle heads 14 and 16 can be selected to form a space 40 in which the opposing sides 44 of the spacer of component 42 are flush or substantially flush with the outer face 38 of the outlets 30 (e.g. to provide a clearance distance between the sides 44 of the spacer of component 42 and outer faces 38 of the outlets 30 of from 0.005 to 0.010 inches). As the spacer of component 42 moves past the second sides 52 of the nozzle heads 14 and 18 and exits the space 40, a sealant material 46, such as a triangular shaped sealant material 46, is formed onto the sides 44 of the spacer of component 42.

The method can be automatically controlled using the controller 110 in operable communication with the one or more computer-readable storage mediums containing programming instructions that, when executed, cause the controller 110 to distribute the sealant material 46 through the first and second nozzle heads 14 and 18. The controller 110 can automatically operate the pump(s) 90 to control the flow rate and pressure at which the sealant material 46 is delivered. For example, the controller 110 can automatically operate the pump(s) 90 to move the sealant material at an upstream line pressure in a range of from 400 psi to 1200 psi. The controller 110 can also operate the temperature within the nozzles 12 and 16 such as, for example, within a range of from 140° F. to 360° F.

Figure 8:
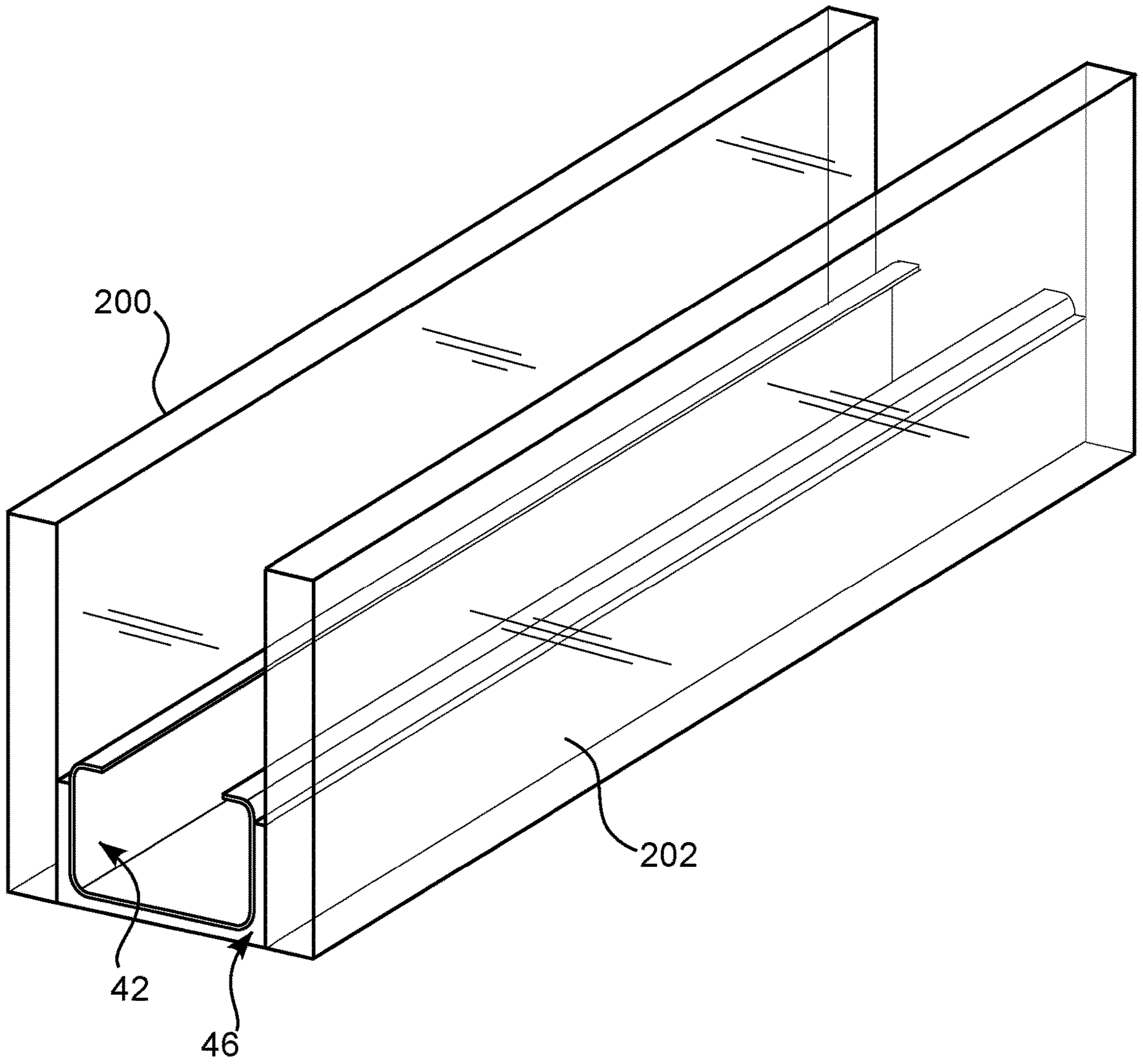
FIG. 8 is a front view of the spacer in FIG. 1 positioned between glass plies.

As previously described, the method can be used to form a spacer of component 42 having sealant material 46, for example triangular shaped sealant material 46, on the opposing sides 44 of the spacer of component 42. Referring to FIG. 8, the resulting spacer of component 42 can be used to form an IGU by being placed between two or more plies of glass 200 and 202.

Figure 9A:
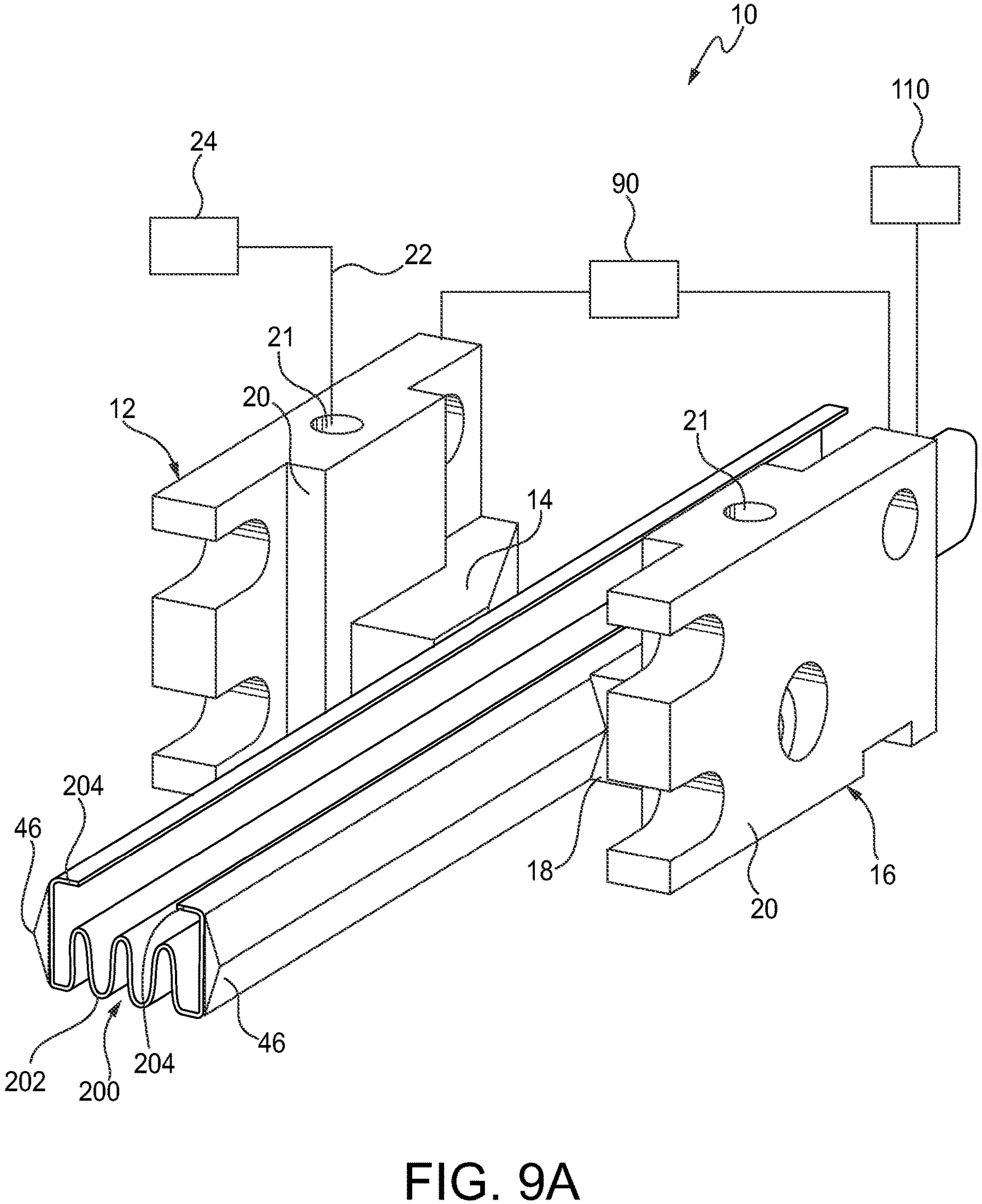
FIG. 9A is a perspective view of the sealant distribution device in FIG. 2 with a spacer passing between the nozzle heads of the device in which the spacer has an undulating shaped bottom wall.
Figure 9B:
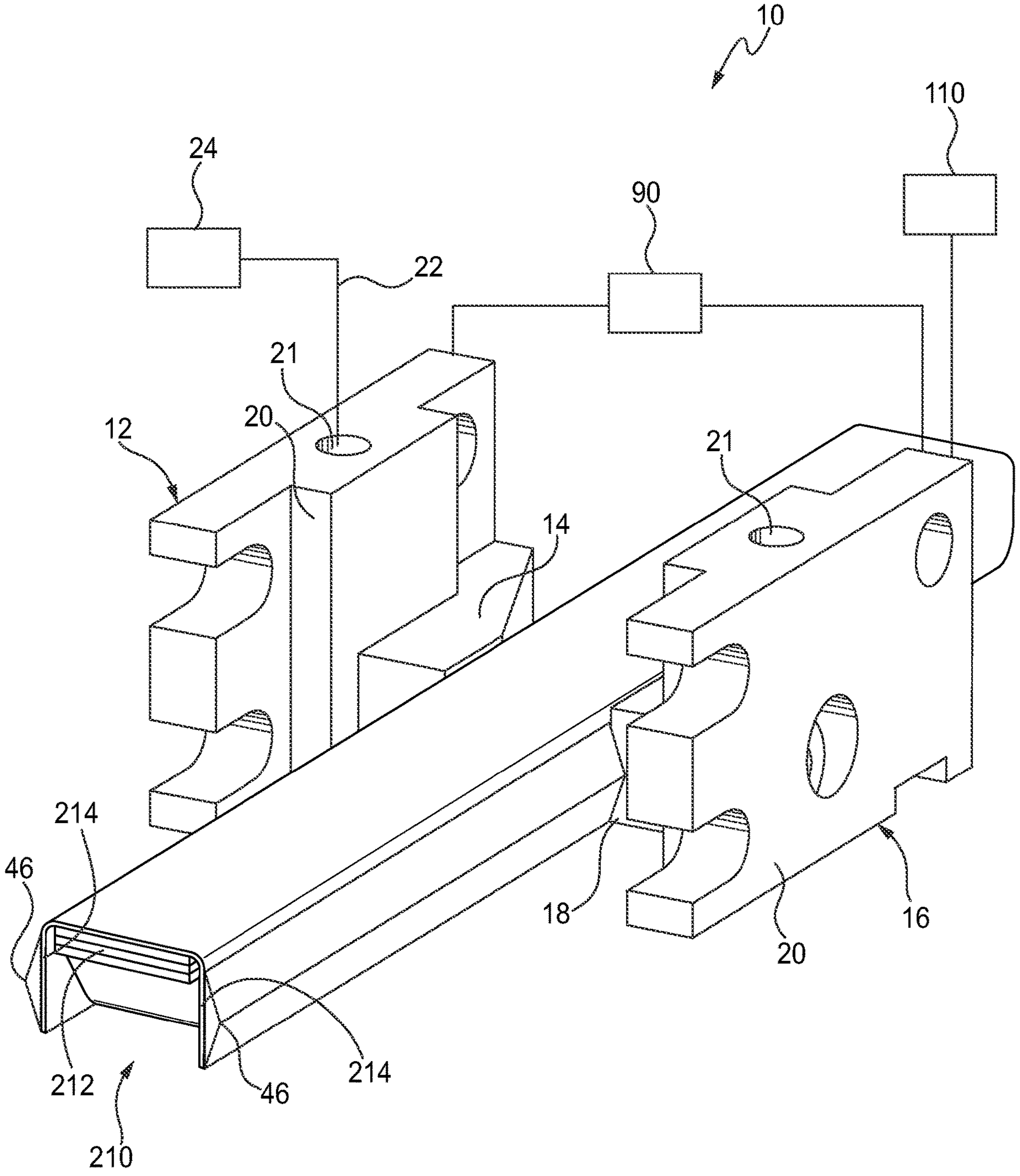
FIG. 9B is a perspective view of the sealant distribution device in FIG. 2 with a spacer passing between the nozzle heads in which the spacer contains encased components for additional properties that are shown with the front of the spacer being cut-away.
Figure 9C:
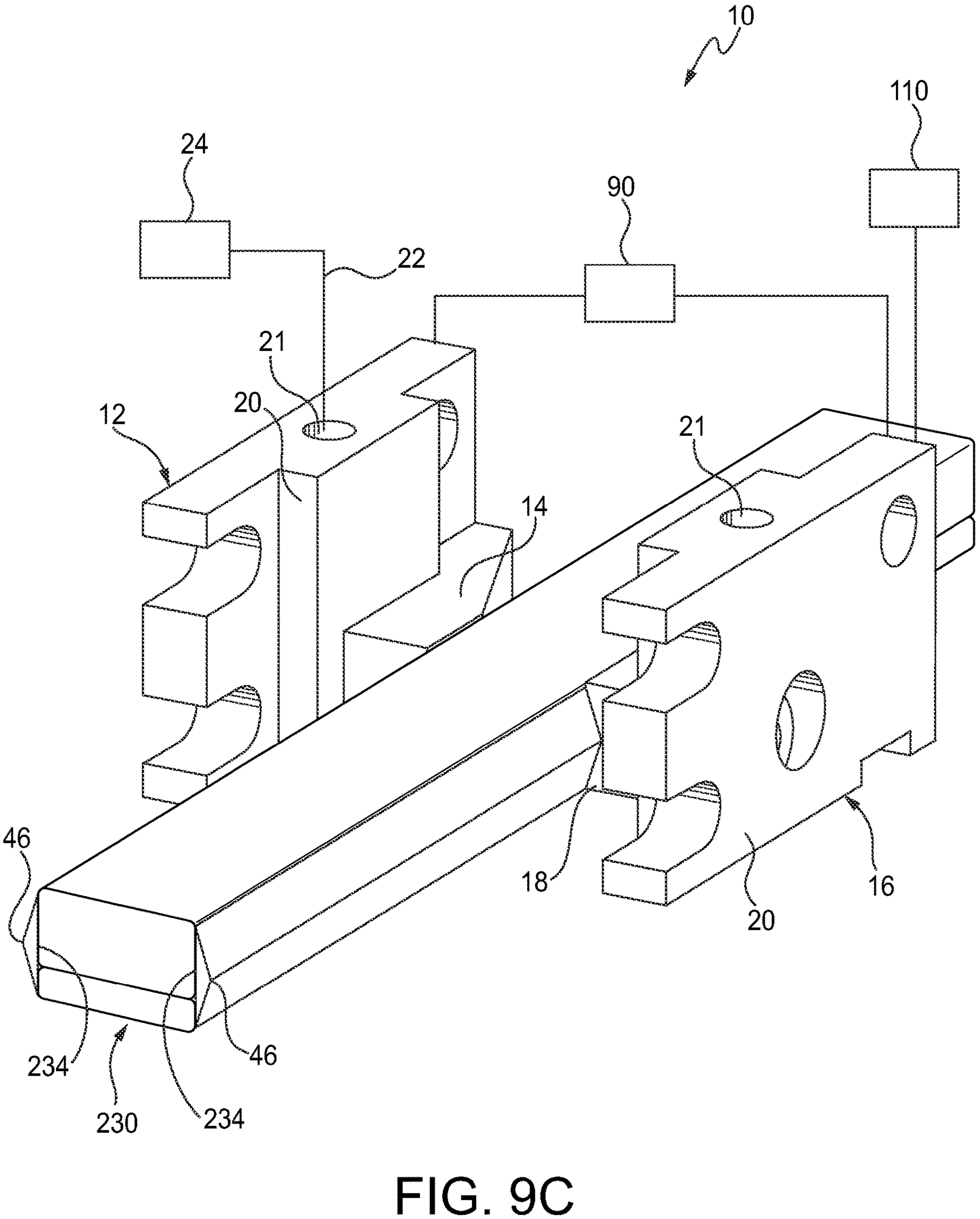
FIG. 9C is a perspective view of the sealant distribution device in FIG. 2 with a spacer passing between the nozzle heads in which the spacer is a polymer, non-metal spacer.
Figure 9D:
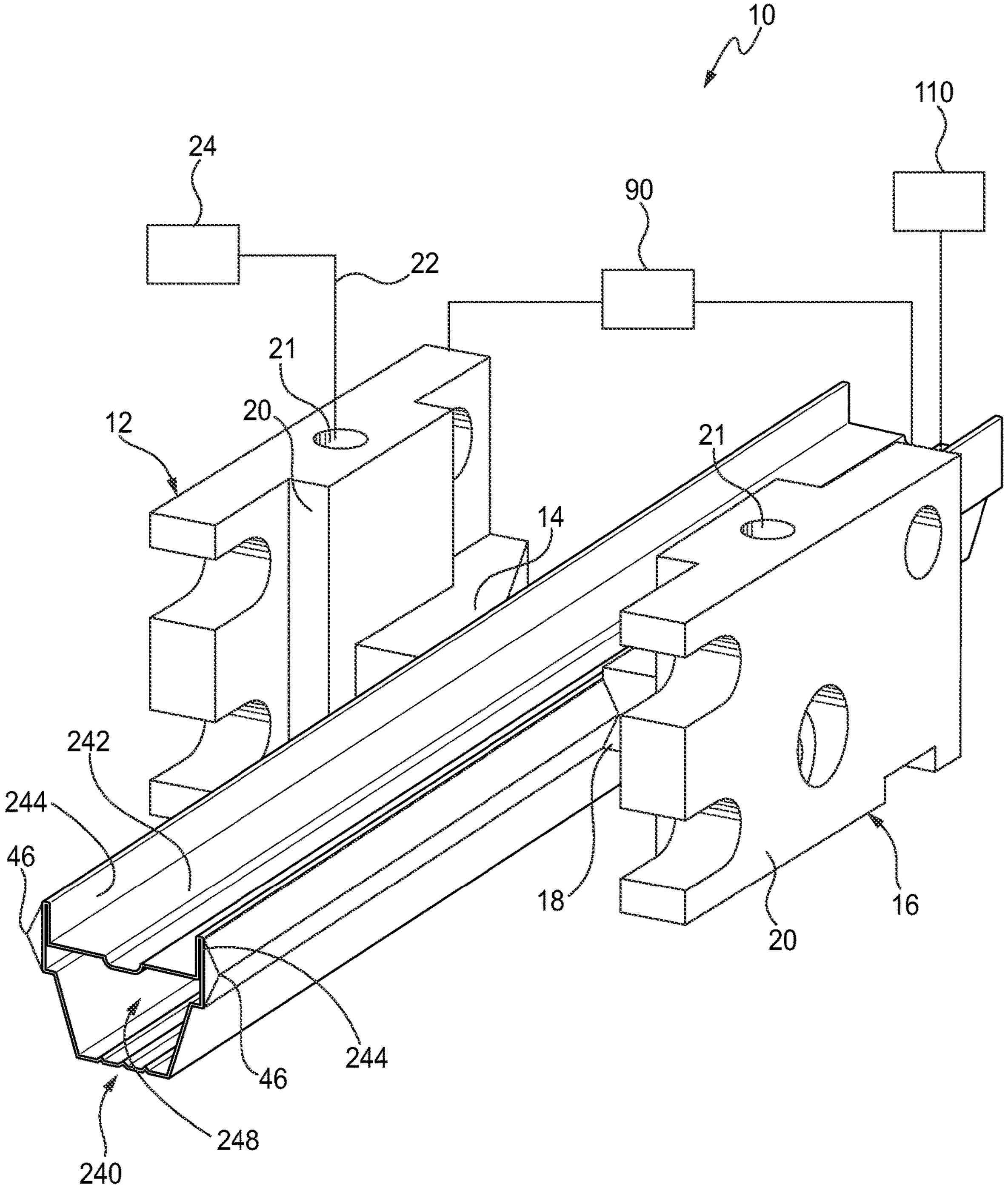
FIG. 9D is a perspective view of the sealant distribution device in FIG. 2 with a spacer passing between the nozzle heads where the spacer includes a channel-shaped portion where a primary seal is formed for the IGU and desiccant fill area below the channel-shaped portion where a secondary seal is formed.

It will be appreciated that the spacer of component 42 can have various shapes, designs, and configurations that the sealant material 46, for example triangular shaped sealant material 46, can be applied with device 10. For example, and as shown in FIG. 8, the spacer of component 42 can be a channel-shaped elongated spacer such as the spacers commercially available from GED under the tradename Intercept®. Alternatively, the spacer of component 42 can have other shapes designs, and configurations, including the shapes illustrated in: FIG. 9A where the spacer 200 has an undulating shaped wall 202 extending between the two sides 204, which is commercially available from GED under the tradename Intercept® Quantum; FIG. 9B where the spacer 210 contains encased components 212 such as at least a polycarbonate or aluminum shim for additional properties and which has two sides 214, which are commercially available from Quanex under the tradenames Duralite® and Duraseal®; FIG. 9C where the spacer 230 is a polymer, non-metal spacer with two sides 234, which is commercially available from Quanex under the tradename Super Spacer®; and FIG. 9D where the spacer 240 includes a channel-shaped portion 242 with two sides 244 where a primary seal is formed for the IGU and desiccant fill area 244 below the channel-shaped portion 242 where a secondary seal is formed, which is commercially available from Cardinal under the tradenames Endur™ and XL Edgel®.

It was found that the previously described device 10 provides additional benefits downstream in a manufacturing process. Specifically, the device 10 makes it possible to obtain better accelerated weathering test results and to operate post-heating oven/roll press equipment at lower temperatures and higher speeds, for example at 14% lower sealant temperatures and 30% to 50% faster line speeds for triple IGUs, as compared to currently known devices and methods of applying sealant materials. The resulting sealant material 46 also provides improved bonding, particularly when applied to the sides of a spacer of component 42 for forming an IGU. The previously described spacer of component 42 was also found to provide a good liquid and gas barrier to prevent liquid and gas, such as air, from flowing into and out of an air gap formed in the IGU.

It is appreciated that the previously described device 10 and method can be utilized in various system for forming a spacer and/or for forming an IGU. Non-limiting examples of such systems are described in the following U.S. patents and which are incorporated by reference herein in their entireties: U.S. Pat. Nos. 7,275,570; 7,445,682; 7,448,246; 7,610,681; 7,802,365; 7,866,033; 7,901,526; 8,056,234; 8,474,400; 8,720,026; 8,904,611; 9,212,515; 9,279,283; 9,428,953; 9,765,564; 10,156,515; 10,184,290; 10,267,083; 10,316,578; 10,352,090; 10,352,091; 10,369,617; 10,533,367; and 10,577,856. The device 10 can be incorporated into various portions of such systems.

Whereas particular embodiments of this invention have been described above for purposes of illustration, it will be evident to those skilled in the art that numerous variations of the details of the present invention may be made without departing from the invention as defined in the appended claims.

The invention claimed is:

1. A device for delivering a sealant material, comprising:
- a first nozzle comprising a first nozzle head; and
- a second nozzle comprising a second nozzle head,
- the first and second nozzle heads each independently comprising an outlet, an inlet opposite the outlet, and an open channel that extends through a body of the nozzle heads from the inlet to the outlet, wherein each of the outlets comprise an outer face that forms a perimeter around at least a portion of the open channel;
- wherein the first nozzle is spaced apart from the second nozzle such that the outlet of the first nozzle head faces the outlet of the second nozzle head with a space formed between the nozzle heads to allow a component to enter a first side of the device or each of the nozzle heads and exit a second side of the device or each of the nozzle heads along a lateral direction while passing by the first and second nozzle heads, and
- wherein a notch is formed through the body of each of the first and second nozzle heads at the second side where the component exits the device to distribute sealant material onto each side of the component, wherein the notches extend through a portion of the body of each of the first and second nozzle heads in a longitudinal direction from the outlet toward the inlet and wherein the notches extend at least through the outer face at the second side of the nozzle heads and into a portion of the body.

2. The device of claim 1, wherein a height of the notches at the outlets of the nozzle heads are greater than a height of the notches where the notches end within the body of the nozzle heads.

3. The device of claim 1, wherein a thickness of the notches extend laterally through the body of the nozzle heads in a direction from the second side of the nozzle heads to the first side of the nozzle heads, and wherein the thickness of the notches extend past the open channels to a point before the first side of the nozzle heads.

4. The device of claim 1, wherein the notches extend longitudinally at a distance of no more than half of the length of the body of the nozzle heads.

5. The device of claim 1, wherein the first and second nozzles each independently comprise a single nozzle.

6. The device of claim 1, wherein the notches are triangular shaped.

7. The device of claim 6, wherein the triangular shaped notches have three points, and wherein a first point of the triangular shaped notches extends through the body of each nozzle head in a longitudinal direction, and a second point and third point of the triangular notches extend through the body of each nozzle head in opposite vertical directions.

8. The device of claim 1, further comprising at least one pump that distributes sealant material through the first and second nozzles heads.

9. The device of claim 8, further comprising a controller in operable communication with the at least one pump, and one or more computer-readable storage mediums in operable communication with the controller and containing programming instructions that, when executed, cause the controller to distribute the sealant material through the first and second nozzle heads.

10. The device of claim 1, wherein the outlets of the nozzle heads are spaced apart at a distance to apply the sealant material onto opposite sides of an elongated spacer for an insulating glass unit.

* * * * *